United States Patent [19]

Weder et al.

[11] Patent Number: 5,344,016

[45] Date of Patent: Sep. 6, 1994

[54] WRAPPING MATERIAL FOR WRAPPING A FLORAL GROUPING HAVING STAGGERED STRIPS OF ADHESIVE MATERIAL APPLIED THERETO AND METHOD

[75] Inventors: Donald E. Weder, Highland, Ill.; Franklin J. Craig, Valley Park, Mo.

[73] Assignee: Highland Supply Corporation, Highland, Ill.

[21] Appl. No.: 803,318

[22] Filed: Dec. 4, 1991

Related U.S. Application Data

[63] Continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned.

[51] Int. Cl.$^5$ ............................. B41L 1/32; B65D 5/02; B65B 25/14
[52] U.S. Cl. .................................. 206/451; 206/460; 229/87.01
[58] Field of Search ..................... 229/87.01, 87.19; 206/460, 449, 451; 53/397, 399

[56] References Cited

U.S. PATENT DOCUMENTS

| | | |
|---|---|---|
| 557,526 | 3/1896 | Egge . |
| 732,889 | 7/1903 | Paver . |
| 1,525,015 | 2/1925 | Weeks .............................. 53/397 UX |
| 1,863,216 | 6/1932 | Wordingham . |
| 1,978,631 | 10/1934 | Herrlinger . |
| 2,032,386 | 3/1936 | Wood ............................... 229/87.01 |
| 2,048,123 | 7/1936 | Howard ................................ 229/87 |
| 2,170,147 | 8/1939 | Lane ............................... 206/460 X |
| 2,278,673 | 4/1942 | Savada et al. ......................... 154/43 |
| 2,371,985 | 3/1945 | Freiberg ............................... 206/46 |
| 2,411,328 | 11/1946 | MacNab ................................... 33/12 |
| 2,510,120 | 6/1950 | Leander .............................. 117/112 |
| 2,529,060 | 11/1950 | Trillich ............................. 117/68.5 |

(List continued on next page.)

FOREIGN PATENT DOCUMENTS 2610604 8/1988 France .

OTHER PUBLICATIONS

Exhibit A is a fan-folded "Post-It ®" Note Pad, for pop-up note dispensers, R-330, 1 Pad (300 Sheets) 3" by 3" (76.2 mm×76.2 mm) Manufactured by 3M Commercial Office Supply Division, St. Paul, Minn. 55144-1000.

Exhibit B is a 6539 note pad "Highland ®" Brand, Self-stick Removable Notes, 1 Pad (100 Sheets Per Pad) 1½"×2" mm×50.8 mm) Manufactured by 3M Commercial Office Supply Division, St. Paul, Minn. 55144-1000.

Exhibit A–Highland Supply Corporation, Speed Cover Brochure. 1989.

Exhibit B–Highland Supply Corporation, Speed Sheet Brochure. 1990.

*Primary Examiner*—Horace M. Culver
*Attorney, Agent, or Firm*—Dunlap, Codding & Lee

[57] ABSTRACT

A wrapping material for wrapping a floral grouping comprising a plurality of sheets of material connected together into a pad of sheets of material via staggered strips of adhesive disposed on each sheet of material in the pad. The pad has a top sheet of material and a next sheet of material disposed thereunder, the other sheets of material being disposed under the next sheet of material. The floral grouping is placed on a sheet of the material, and the sheet of material is wrapped about a portion of the floral grouping and simultaneously disconnected from the pad of sheets of material. The sheets of material are secured about the floral grouping in a wrapped position by the staggered strips of adhesive on each sheet of material.

22 Claims, 5 Drawing Sheets

U.S. PATENT DOCUMENTS

| | | | |
|---|---|---|---|
| 2,544,075 | 3/1951 | Ernst et al. | 150/49 |
| 2,621,142 | 12/1952 | Wetherell | 154/117 |
| 2,822,287 | 2/1958 | Avery | 117/14 |
| 2,846,060 | 8/1958 | Yount | 206/58 |
| 2,883,262 | 4/1959 | Borin | 21/56 |
| 3,022,605 | 2/1962 | Reynolds | 47/58 |
| 3,113,712 | 12/1963 | Kindseth | 229/14 |
| 3,121,647 | 2/1964 | Harris et al. | 118/202 |
| 3,130,113 | 4/1964 | Silman | 161/97 |
| 3,148,799 | 9/1964 | Meroney | 220/63 |
| 3,215,330 | 11/1965 | Thomas | 229/14 |
| 3,271,922 | 9/1966 | Wallerstein et al. | 53/3 |
| 3,508,372 | 4/1970 | Wallestein et al. | 53/3 |
| 3,514,012 | 5/1970 | Martin | 220/63 |
| 3,620,366 | 11/1971 | Parkinson et al. | 206/59 C |
| 3,681,105 | 8/1972 | Milutin et al. | 117/15 |
| 3,757,990 | 9/1973 | Buth | 220/63 R |
| 3,927,821 | 12/1975 | Dunning | 229/14 BL |
| 4,054,697 | 10/1977 | Reed et al. | 428/40 |
| 4,216,620 | 8/1980 | Weder et al. | 47/72 |
| 4,333,267 | 6/1982 | Witte | 47/84 |
| 4,379,101 | 4/1983 | Smith | 264/40.3 |
| 4,380,564 | 4/1983 | Cancio et al. | 428/167 |
| 4,413,725 | 11/1983 | Bruno et al. | 206/45.33 |
| 4,444,315 | 4/1984 | Gaskill, Jr. | 206/449 |
| 4,546,875 | 10/1985 | Zweber | 206/0.82 |
| 4,733,521 | 3/1988 | Weder et al. | 53/580 |
| 4,765,464 | 8/1988 | Ristvedt | 206/0.82 |
| 4,773,182 | 9/1988 | Weder et al. | . |
| 5,014,852 | 5/1991 | Herrington et al. | 206/460 X |
| 5,111,638 | 5/1992 | Weder et al. | . |

WRAPPING MATERIAL FOR WRAPPING A FLORAL GROUPING HAVING STAGGERED STRIPS OF ADHESIVE MATERIAL APPLIED THERETO AND METHOD

CROSS REFERENCE TO RELATED APPLICATIONS

This application is a continuation-in-part of U.S. Ser. No. 707,417, filed May 28, 1991, entitled WRAPPING A FLORAL GROUPING WITH SHEETS HAVING ADHESIVE OR COHESIVE MATERIAL APPLIED THERETO, now abandoned, which is a continuation of U.S. Ser. No. 502,358, filed Mar. 29, 1990, now abandoned, entitled WRAPPING A FLORAL GROUPING WITH SHEETS HAVING ADHESIVE OR COHESIVE MATERIAL APPLIED THERETO, which is a continuation-in-part of U.S. Ser. No. 391,463, filed Aug. 9, 1989, entitled ADHESIVE now abandoned, which is a continuation-in-part of U.S. Ser. No. 249,761, filed Sep. 26, 1988, now abandoned, entitled METHOD FOR WRAPPING AN OBJECT IN A MATERIAL HAVING PRESSURE SENSITIVE ADHESIVE THEREON.

FIELD OF THE INVENTION

The present invention relates generally to wrapping material for wrapping a floral grouping having staggered strips of adhesive material applied thereto and the method of using same.

DESCRIPTION OF THE PREFERRED EMBODIMENTS

The Embodiments of FIGS. 1-5

Figure 3:
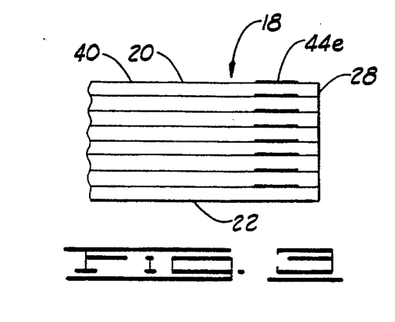
FIG. 3 is an enlarged cross-sectional partial view of FIG. 2 taken along the lines 3—3 of FIG. 2, showing a vertical alignment of the staggered strips of adhesive.
Figure 4:
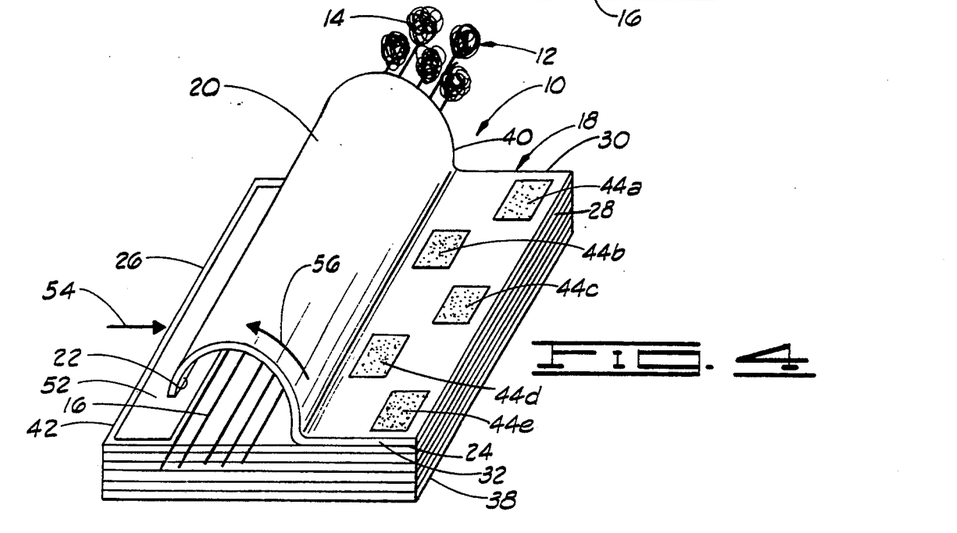
FIG. 4 is a perspective view of the pad, similar to FIG. 2, but showing a floral grouping disposed on a portion of the next sheet of material, and further showing a portion of the top sheet of material wrapped partially about the floral grouping.
Figure 5:
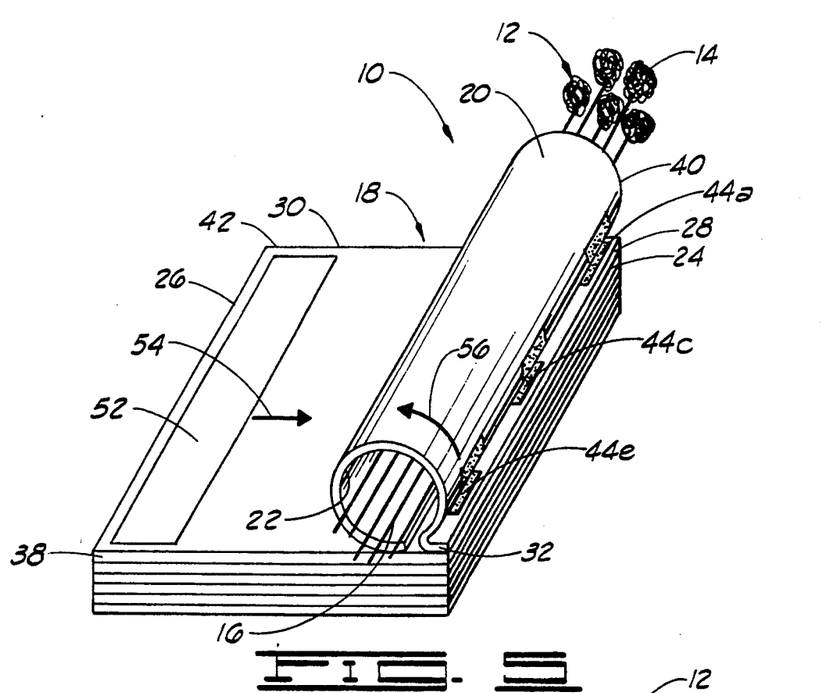
FIG. 5 is a perspective view of the pad shown in FIG. 2 and 4 with the top sheet of material wrapped generally about the floral grouping just prior to the top sheet of material being disconnected from the pad.
Figure 6:
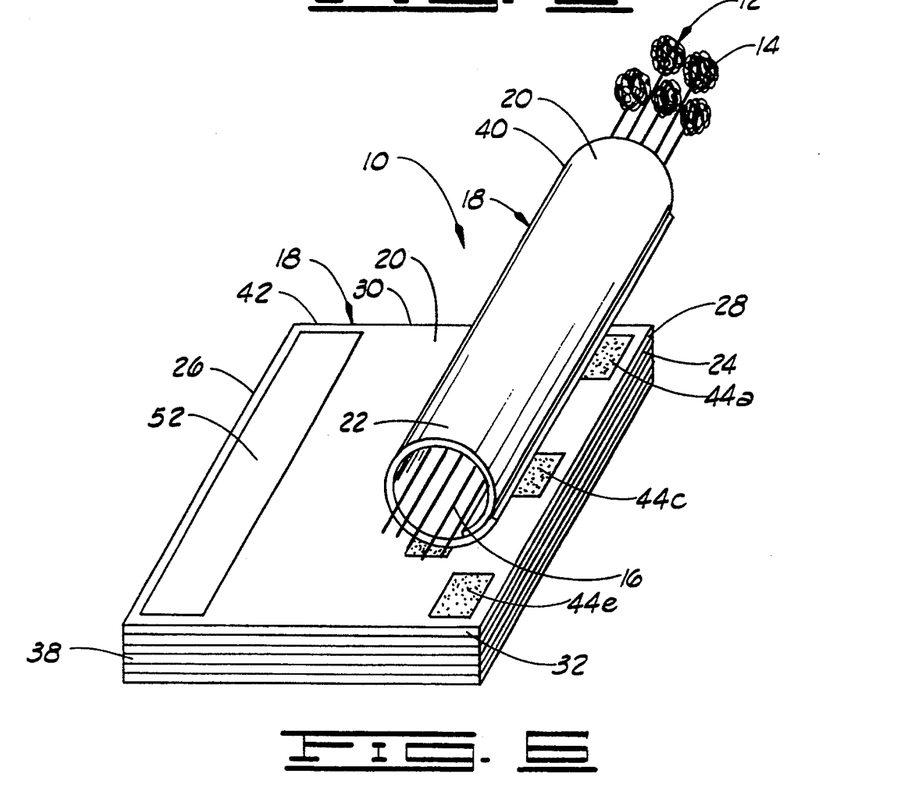
FIG. 6 is a perspective view of the pad shown in FIGS. 2-4 showing the floral grouping wrapped with the top sheet of material just after the top sheet of material has been disconnected from the pad.

Referring to FIGS. 1-6, designated generally by the reference numeral 10 is a wrapping material constructed in accordance with the present invention for wrapping an item, the item herein being a floral grouping. One such floral grouping is shown in FIGS. 4, 5 and 6, and is generally designated by the numeral 12.

Figure 12:
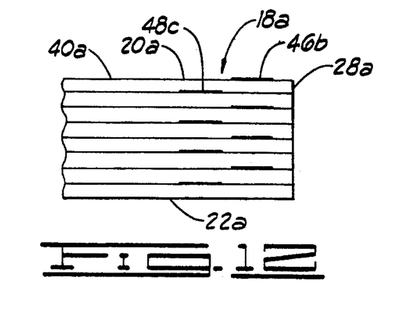
FIG. 12 is an enlarged cross-sectional partial view of FIG. 11 taken along the lines 12—12 of FIG. 11, showing an alternating vertical alignment of the staggered strips of adhesive.

"Floral grouping" as used herein means cut fresh flowers, artificial flowers, other fresh and/or artificial plants or other floral materials and may include other secondary plants and/or ornamentation which add to the aesthetics of the overall floral grouping 12. The floral grouping 12 comprises an upper end consisting of a bloom, foliage or flower portion 14 and a stem lower end consisting of a stem portion 16. However, it will be appreciated that the floral grouping 12 may consist of only a single bloom 14 or only foliage 14 (not shown).

Figures 1, 2:
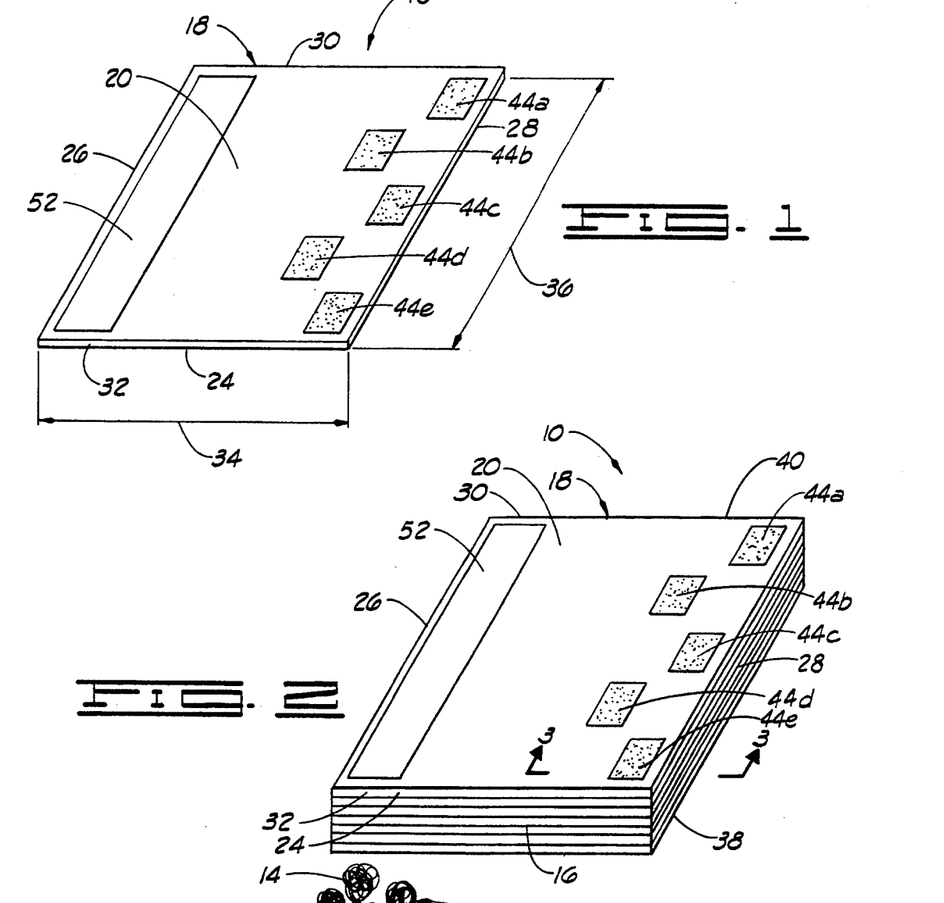
FIG. 1 is a perspective view of the sheet of material of the present invention, showing the upper surface.
FIG. 2 is a perspective view of a plurality of sheets of material with each sheet being constructed as shown in FIG. 1 and with the sheets connected together to form a pad of sheets of material.

Referring to FIGS. 1-2, the wrapping material 10 comprises a sheet of material 18. The sheet of material 18 comprises an upper surface 20, a lower surface 22, and an outer periphery 24. The outer periphery 24 of the sheet of material 18 comprises a first side 26, a second side 28, a third side 30, and fourth side 32.

In the embodiments of FIGS. 1-6, the sheet of material 18 is rectangular. It will be appreciated, however, that any shape or size of sheet 18 may be used to wrap a floral grouping 12 as long as it is sufficiently sized and shaped to wrap and encompass a floral grouping 12. For example, the sheet of material 18 may also comprise other shapes, i.e., square, round, oval, octagonal, asymmetrical, or the like. And multiple sheets of material 18 may be used. Moreover, when multiple sheets of material 18 are used in combination, the sheets of material 18 need not be uniform in size or shape. Finally, it will be appreciated that each sheet of material 18 shown herein is substantially flat.

The sheet of material 18 may be constructed of a single sheet of material or a plurality of sheets. Any thickness of the sheet of material 18 may be utilized in accordance with the present invention as long as the sheet of material 18 may be wrapped about at least a portion of a floral grouping 12, as described below. The sheet of material 18 has a thickness of less than about 1 mil to about 30 mils. Typically, the sheet of material 18 has a thickness in a range of less than about 0.2 mils to about 30 mils. In a preferred embodiment, the sheet of material 18 is constructed from one sheet of man-made organic polymer film having a thickness in a range of from less than about 0.5 mils to about 2.5 mils. Additionally, an insulating material such as bubble film (not shown), preferable as one of two layers, can be utilized in order to provide needed protection for the item wrapped therein. Bubble film is well known in the art, and commercially available.

The sheet of material 18 is constructed from any suitable material that is capable of being wrapped about a floral grouping. Preferably, the wrapping material 10 comprises paper (untreated or treated in any manner), cellophane, foil, man-made organic polymer film, fiber (woven or nonwoven or synthetic or natural), burlap, or combinations thereof.

The term "man-made organic polymer film" means a man-made resin such as a polypropylene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally, a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention. For example, one such man-made organic polymer film is a polypropylene film.

The sheet of material 18 may vary in color. Further, the sheet of material 18 may consist of designs which are printed, etched, and/or embossed; in addition, the sheet of material 18 may have various colorings, coatings, flocking and/or metallic finishes, or be characterized totally or partially by pearlescent, translucent, transparent, or the like, qualities. Each of the above-named characteristics may occur alone or in combination. Moreover, each surface of the sheet of material 18 may vary in the combination of such characteristics.

Each sheet of material 18 has a width 34 (FIG. 1) extending generally between the first and the second sides 26 and 28, respectively, sufficiently sized whereby each sheet of material 18 can be wrapped about and encompass the floral grouping 12. Each sheet of material 18 has a length 36 (FIG. 1) extending generally between the third and the fourth sides 30 and 32, respectively, sufficiently sized whereby the sheet of material 18 extends over a substantial portion of the floral grouping 12 when the sheet of material 18 has been wrapped about the floral grouping 12 in accordance with the present invention.

The present invention contemplates a plurality of sheets of material 18 connected together to form a pad 38 of sheets of material 18, as shown in FIGS. 2–13. The pad 38 comprises a plurality of sheets of material 18 stacked one on top of the other and positioned so that the periphery 24, that is, the first sides 26, the second sides 28, the third sides 30 and the fourth sides 32 of sheets of material 18 in the pad 38 generally are aligned.

Referring to FIGS. 2–10, the pad 38 further comprises a top sheet of material 40 and a next sheet of material 42 disposed thereunder, the other sheets of material 18 being disposed under the next sheet of material 42 in the pad 38 of sheets of material 18. Each sheet of material 18 in the pad 38 has staggered strips of adhesive 44a, 44b, 44c, 44d, and 44e disposed thereupon, near a portion of the periphery 24 of the sheet of material 18, and each sheet of material 18 is adhesively connectable to a portion of another sheet of material 18 for cooperating to connect the sheets of material 18 into the pad 38.

The top sheet of material 40 is capable of being disconnected from the pad 38 of sheets of material 18. When the top sheet of material 40 is disconnected, the next sheet of material 42 forms the new top sheet of material 40, and the sheet of material 18 lying under the new top sheet of material 40 forms a new next sheet of material 42.

Staggered strips of adhesive 44a–e are disposed on the upper surface 20 of the sheet of material 18, as illustrated in FIGS. 1–10 "Staggered strips of adhesive" as used herein, is defined as an adhesive disposed in limited strips, spots, or designs, on at least one surface (the upper surface 20; the lower surface 22) of the sheet of material 18 near the periphery 24 by either spraying it thereupon, painting it thereupon, or by any method which would dispose the adhesive thereon. "Limited strips, spots, or designs of adhesive" means that none of the adhesive applied to the sheets of material 18 is limited to being applied near the periphery 24 of the sheet of material 18. A single staggered strip of adhesive may comprise a strip, spot, or design which extends from one side to another side of the sheet of material 18 near the periphery 24 (not shown). The adhesive used in the staggered strips of adhesive defined herein may be any one of those where the adhesive permits an adhesive connection and a releasable connection between sheets of material 18. Such adhesives are known in the art and commercially available.

The staggered strips of adhesive 44a–e impart sufficient adhesion to permit the sheet of material 18 to be wrapped around a floral grouping 12, with either the upper surface 20 or the lower surface 22 of the sheet of material 18 disposed adjacent the floral grouping 12. The staggered strips of adhesive 44a–e on the upper surface 20 of the sheet of material 18 adhesively contact another portion of the sheet of material 18 for adhesively connecting the sheet of material 18 to itself, after the sheet of material 18 is wrapped about at least a portion of a floral grouping 12.

Figure 13:
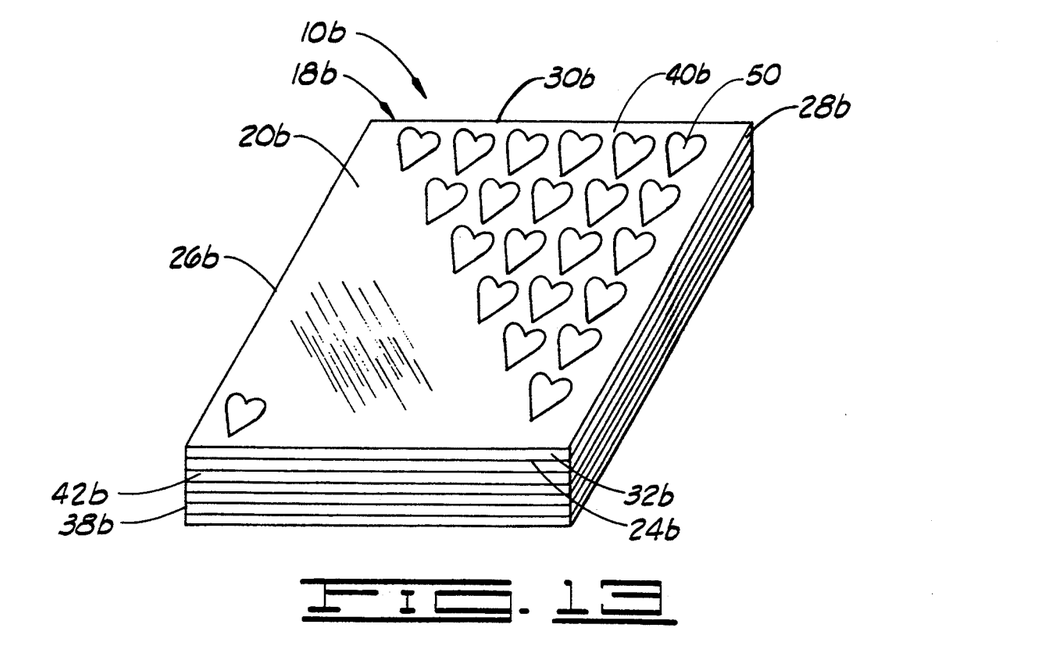
FIG. 13 is a perspective view of a modified plurality of sheets of material connected together to form a pad of sheets of material, with each sheet of material constructed exactly like the sheets of material of FIGS. 1-5, except that the staggered strips of adhesive comprise a plurality of red hearts, and the inert material is not disposed the sheets of material.

The staggered strips of adhesive 44a–e, in the embodiment shown in FIG. 1–10, generally are disposed near the periphery 24 of the sheet of material 18 and extend a distance from the second side 28, the staggered strips of adhesive 44a–e extending generally between the third side 30 and the fourth side 32 of the sheet of material 18. In an alternative embodiment shown in FIGS. 11–12, staggered strips of adhesive 46a, 46b, 46c, and 46d are disposed upon and extend partially across the upper surface 20a of the sheet of material 18a to at least partially cover the upper surface 20 of the top sheet of material 40a. Staggered strips of adhesive 48a, 48b, 48c, and 48d on the next sheet of material 42a in the pad 38a are observed through the transparent top sheet of material 40a and extend at least partially across the upper surface 20a of the next sheet of material 42a. In addition, staggered strips of adhesive 50 may also be disposed upon and extend over a substantial portion of the upper surface 20b of the sheet of material 18b, as illustrated in FIG. 13. In a further embodiment of the present invention (not shown), staggered strips of adhesive may extend over at least a portion of the lower surface of the sheet of material.

Referring again to FIGS. 1–10, the staggered strips of adhesive 44a-e on each sheet of material 18 adhesively and releasably connect each sheet of material 18 to one other sheet of material 18 whereby one of the sheets of material 18 can be releasably disconnected from another sheet of material 18 by pulling the sheets of material 18 apart. Further, the staggered strips of adhesive 44a-e adhesively and releasably connect each sheet of material 18 to portions of itself.

Figure 9:
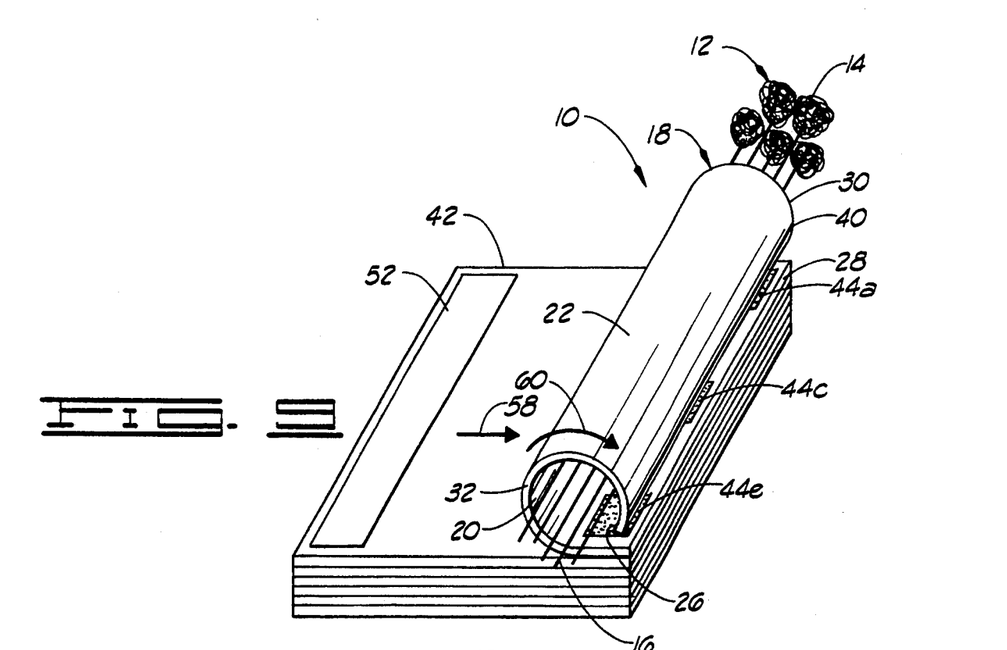
FIG. 9 is a perspective view of the pad of sheets of material shown in FIG. 7 with the top sheet of material wrapped generally about the floral grouping just prior to the top sheet of material being disconnected from the pad.
Figure 10:
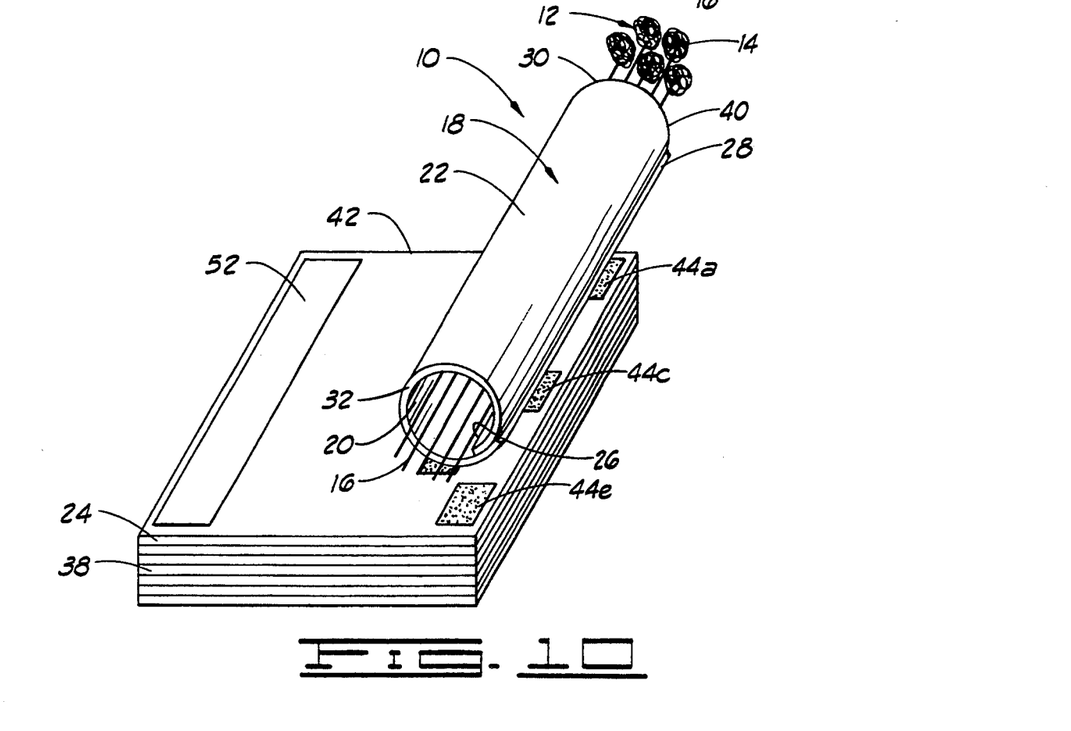
FIG. 10 is a perspective view of the pad of sheets of material shown in FIGS. 7-9 with the showing the floral grouping wrapped with the top sheet of material just after the top sheet of matrial has been disconnected from the pad.
Figure 11:
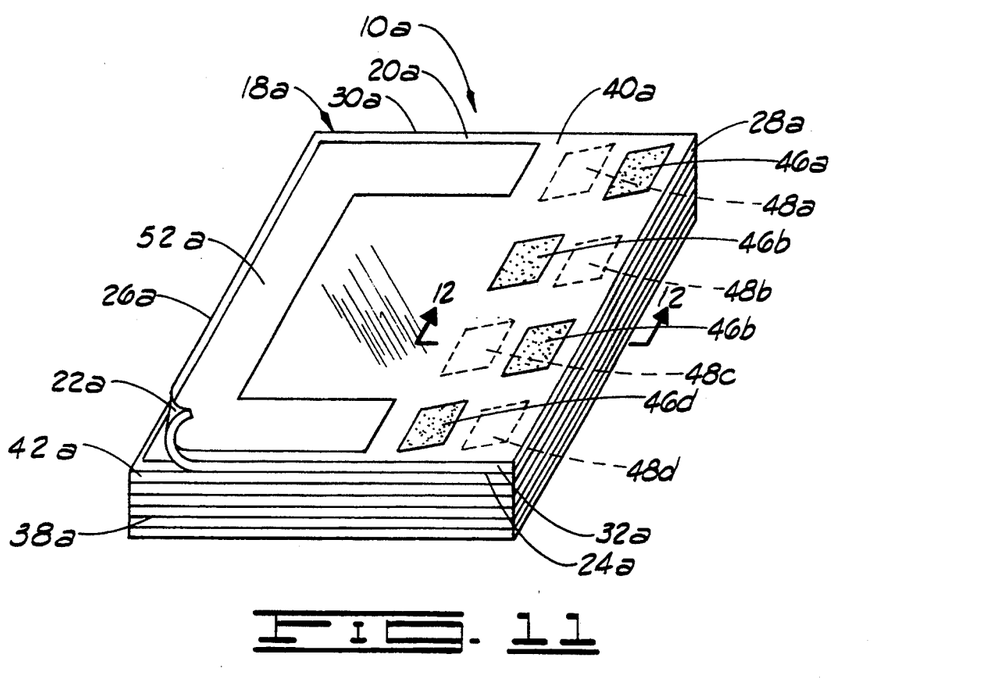
FIG. 11 is a perspective view of a modified plurality of sheets of material connected together to form a pad of sheets of material, with each sheet of material constructed exactly like the sheets of material of FIGS. 1-5, except that the staggered strips of adhesive comprise parallelograms in an alternating vertical alignment, and the inert material is disposed near the first, third, and fourth sides of the sheets of material.

The staggered strips of adhesive 44a-e may comprise any geometric form, for example, squares, as shown in FIGS. 1–10, or parallelograms, as shown in FIG. 11, as well as round spots, triangles, rectangles, octagonals, or the like (not shown). The staggered strips of adhesive 44a-e may also comprise any non-geometric, asymmetrical or fanciful forms, for example, hearts (shown in FIG. 13), flowers, lace, slogans, logos, and the like (not shown).

Ink, dye, pigment, or any combination thereof of any color or combination of colors can be mixed with the adhesive, to create a colored adhesive. Staggered strips of colored adhesive may provide at least a portion of the surface decoration of the sheet of material 18. In a preferred embodiment, shown in FIG. 13, each sheet of material 18b in the pad 38b comprises at least one transparent section, and fancifully designed staggered strips of colored adhesive 50 (the staggered strips of colored adhesive being red hearts, and only one of the staggered strips of colored adhesive 50 being designated) are disposed over at least a portion of the transparent section of each of the sheets of material 18b. The transparent section of each sheet of material 18b is preferably constructed from man-made polymers, or from cellophane, or from a combination thereof.

In FIGS. 1–10, the staggered strips of adhesive 44a-e disposed upon the upper surface 20 of each sheet of material 18 have, in a preferred embodiment, a thickness in a range from less than about 1 mil to about 30 mils. Typically, the staggered strips of adhesive 44a-e each have a thickness in a range of less than about 0.2 mils to about 30 mils. In a preferred embodiment, the staggered strips of adhesive 44a-e are disposed upon one sheet of man-made organic polymer film, the staggered strips of adhesive 44a-e having a thickness in a range of from less than about 0.5 mils to about 2.5 mils.

The staggered strips of adhesive 44a-e disposed on each sheet of material 18 are disposed in a vertical alignment in the pad 38. "Vertical alignment" is defined as the staggered strips of adhesive 44a-e on each sheet of material 18 being precisely vertically aligned with all other staggered strips of adhesive 44a-e on each sheet of material 18 in the pad 38, so that the staggered strips of adhesive 44a-e are stacked, one on top of the other, in the pad 38. FIG. 3 illustrates such a vertical alignment.

In an alternate embodiment, shown in FIGS. 11–12, staggered strips of adhesive 46a-d disposed on the top sheet of material 40a are aligned in an alternating vertical alignment in the pad 38a. "Alternating vertical alignment" is defined as the staggered strips of adhesive 46a-d on the top sheet of material 40a being in a vertically aligned stack with all other staggered strips of adhesive directly below the staggered strips of adhesive 46a-d on every other sheet of material 18a in the pad 38a. In this alignment, in each stack a portion of a sheet of material 18a will be layered between each staggered strip of adhesive 46a-d, as illustrated in FIG. 12, so that a stack comprises, for example, a staggered strip of adhesive on a top sheet, then a portion of a next sheet of material, and then another staggered strip of adhesive from the sheet of material directly below the next sheet of material, and so forth.

Referring again to FIGS. 1–10, disposed on the upper surface 20 of each sheet of material 18 in the pad 38 is an inert material 52. The inert material 52 is disposed, generally, near a portion of the periphery 24 of each sheet of material 18. "Inert material" as used herein is defined as a material which is about the same thickness as the staggered strips of adhesive described previously, and which is used to provide a thickness near at least one side of the sheet of material 18 to counter the thickness of the staggered strips of adhesive 44a-e disposed on an opposing side of each sheet of material 18. The use of the inert material 52 on each of the sheets of material 18 prevents a greater thickness of the pad 38 of sheets of material 18 on the side in which the staggered strips of adhesive 44a-e are disposed. The inert material 52 creates about an equal thickness of each sheet of material 18 stacked together in the pad 38 of sheets of material 18, as illustrated in FIGS. 2–10. The inert material 52 has no properties of adhesion or cohesion.

The inert material 52 preferably comprises rectangular strips of material, as shown in FIGS. 1–10, but may also comprise other geometric patterns, for example, round spots, squares, parallelograms, triangles, octagonals, or the like. The inert material 52 may further comprise non-geometric, asymmetric, or fanciful patterns, such as heart, flowers, slogans, logos, or the like (for example, the "C" pattern of FIG. 11).

The inert material 52 may comprise one or more layers of material, and may comprise one or more colors. Each portion of inert material 52 may vary in color. Further, each inert material 52 may vary in size. And each inert material 52 may consist of designs which are printed, etched, and/or embossed; in addition, each inert material 52 may have various colorings, coatings, flocking and/or metallic finishes, or be characterized totally or partially by pearlescent, translucent, transparent, or the like, qualities. Each of the above-named characteristics may occur alone or in combination. Moreover, the inert material 52 may vary on each surface of each sheet of material 18 in the combination of such characteristics.

The inert material 52 may comprise the same material as the sheet of material 18 or a different material. Preferably, the inert material 52 comprises paper (untreated or treated in any manner), cellophane, foil, man-made organic polymer film, fiber (woven or nonwoven or natural or synthetic), burlap, or combinations thereof.

The inert material 52 is preferably disposed near at least one side of each sheet of material 18 and extends a distance therefrom. The inert material 52, however, is disposed in a location which is mutually exclusive to the location of the staggered strips of adhesive 44a–e. That is, when the staggered strips of adhesive 44a–e are disposed near the second side 28 of the sheet of material 18, as described previously, the inert material 52 is disposed near the first side 26 of the sheet of material 18, as illustrated in FIGS. 1–10. As shown in FIG. 11, the inert material 52a may be disposed near the first side 26a, the third side 30a, or the fourth side 32a of the sheet of material 18a, or any combination thereof.

The inert material 52 may be incorporated into the sheet of material 18 during the extrusion process (the extrusion of man-made films being well known in the art). Alternatively, the inert material 52 may be heat sealed by any means which would at least partially dispose the inert material 52 into the sheet of material 18, or, the inert material 52 may be glued to the sheet of material 18 by disposing, by any method disclosed herein, any adhesive which would permanently bond the inert material 52 to the sheet of material 18. Such adhesives are commercially available, and known in the art.

The inert material 52 has a thickness in a range from less than about 1 mil to about 30 mils. And in a preferred embodiment, the inert material 52 is man-made organic polymer film and is disposed, by any method described herein, upon sheets of man-made organic polymer film, the inert material 52 having a thickness in a range of from less than about 0.5 mils to about 2.5 mils.

In a general method of use in the embodiments illustrated in FIGS. 4–6 and 7–10, a plurality of sheets of material, and a floral grouping, as previously described, are provided. The floral grouping is placed on a sheet of material in the pad, and the sheet of material is wrapped about the floral grouping, the sheet simultaneously disconnecting from the pad of sheets of material as the sheet is wrapped about the floral grouping. The first side of the sheet of material overlaps other portions of the sheet of material. The overlapping portions of the sheet of material are bonded to the sheet of material by their contact with the staggered strips of adhesive on the upper surface which adhesively bond to the overlapping portions of the sheet of material, whereby the first side of the sheet of material is bonded to overlapping portions of the sheet of material generally between the first and second ends of the sheet of material whereby there are no loose flaps formed by unbonded portions of the first side of the sheet of material. The sheet of material substantially encompasses and surrounds a substantial portion of the flower portion of the floral grouping and a substantial portion of the stem portion of the floral grouping. The sheet of material is held about the floral grouping by the bonding of the overlapping portions of the sheet of material, the sheet of material being tightly wrapped about the stem portion of the floral grouping. The sheet of material wrapped about the floral grouping forms a conically shaped wrapping having an opening extending through a lower end thereof and an opening extending through the upper end thereof with the stem portion of the floral grouping extending through the opening in the lower end and the flower portion of the floral grouping being exposed near the opening in the upper end thereof, the upper end of the wrapping being loosely wrapped about the flower portion of the floral grouping.

The Method of FIGS. 4–6

FIGS. 4–6 show one specific method of use. A plurality of sheets of material in a pad, and a floral grouping, as described above, are provided. In a method of use of the embodiments illustrated in FIGS. 4–6, the top sheet of material 40 is lifted from the pad 38, generally near the first side 26, exposing the next sheet of material 42 thereunder. A floral grouping 12 is placed on a portion of the next sheet of material 42, as shown in FIG. 4, generally near the first side 26 of the next sheet of material 42. An operator then places a portion of the lifted top sheet of material 40 (generally the portion near the first side 26) over a portion of the floral grouping 12, wherein the lower surface 22 of the lifted top sheet of material 40 contacts the floral grouping 12. In this position, the top sheet of material 40 is rolled under the floral grouping 12, and the top sheet of material 40 and the floral grouping 12 are then rolled in a general direction 54 (FIGS. 4–5) whereby the floral grouping 12 is lifted from the next sheet of material 42 and rolled into the top sheet of material 40, thereby rolling the top sheet of material 40 generally about the floral grouping 12 and containing the floral grouping 12 within the top sheet of material 40.

The top sheet of material 40 and the floral grouping 12 are rolled in a rolling direction 56 and in the direction 54 generally toward the second side 28 of the top sheet of material 40 until the floral grouping 12 is disposed generally adjacent the second side 28 of the top sheet of material 40, as shown in FIG. 5. In this position, the operator continues to roll the top sheet of material 40 and the floral grouping 12 disposed thereon in the rolling direction 56 and in the general direction 54 thereby lifting the top sheet of material 40 from the staggered strips of adhesive 44a–e on the upper surface 20 of the next sheet of material 42 disposed generally beneath the top sheet of material 40 and simultaneously disconnecting the top sheet of material 40 from the adhesive connection between the top sheet of material 40 and the next sheet of material 42. The adjacent upper surface 20 of the first side 26 of the top sheet of material 40 is then adhesively connected to the staggered strips of adhesive 44a–e on the upper surface 20 of the top sheet of material 40 thereby securing the top sheet of material 40 and securely wrapping the floral grouping 12, as shown in FIG. 6.

When the top sheet of material 40 has been secured about the floral grouping 12 in the manner just described, the next sheet of material 42, generally under the top sheet of material 40, then provides a new top sheet of material 40, the sheet of material 18 under the new top sheet of material 40 providing a new next sheet of material 42, and the process can be repeated for wrapping additional or other floral groupings.

The Method of FIGS. 7–10

FIGS. 7–10 show an alternate specific method of packaging an item, wherein the item being packaged comprises a floral grouping 12. A plurality of sheets of material 18 in a pad 38 and a floral grouping 12, as previously described, are provided.

Figure 7:
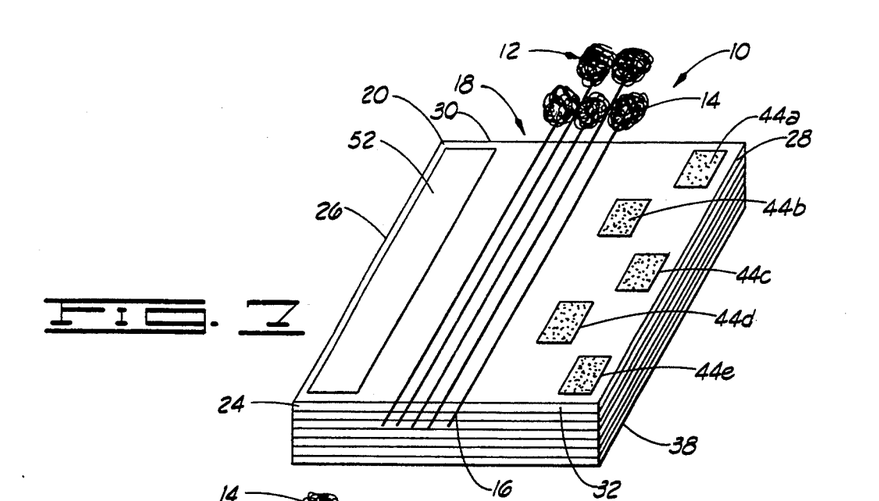
FIG. 7 is a perspective view of a plurality of sheets of material with each sheet being constructed as shown in FIG. 1 and with the sheets connected together to form a pad of sheets of material, a floral grouping being shown in FIG. 7 disposed on a portion of the top sheet of material of the pad.
Figure 8:
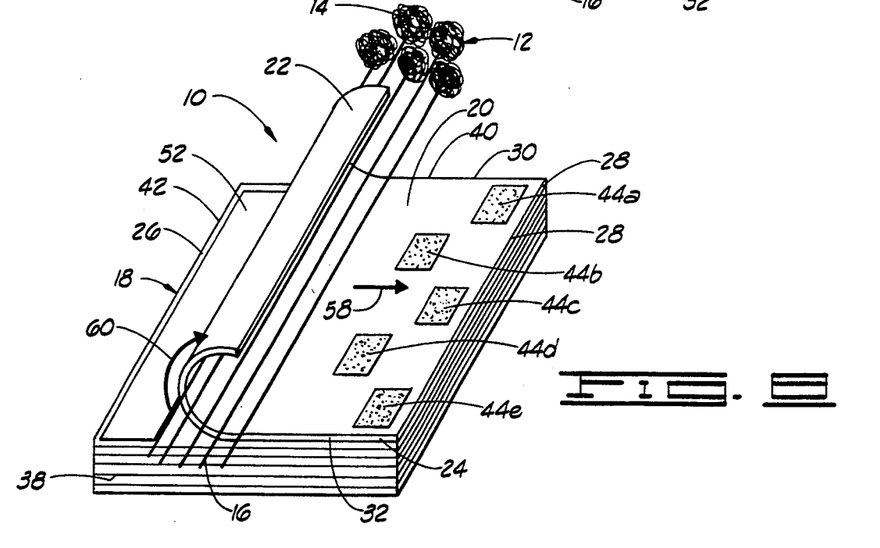
FIG. 8 is a perspective view of the pad of sheets of material, similar to FIG. 7, but showing a portion of the top sheet of material wrapped partially about the floral grouping.

The floral grouping 12 is placed on a portion of the top sheet of material 40, as shown in FIG. 7, generally near the first side 26 of the top sheet of material 40. An operator then lifts a portion of the top sheet of material 40 generally near the first side 26 thereof and places the lifted portion of the top sheet of material 40 generally about a portion of the floral grouping 12, as shown in FIG. 8. In this position, the top sheet of material 40 and the floral grouping 12 are rolled in a general direction 58 thereby rolling the top sheet of material 40 generally about the floral grouping 12. The top sheet of material 40 and the floral grouping 12 are rolled in a rolling direction 60 and in the direction 58 generally toward the second side 28 of the top sheet of material 40 until the floral grouping 12 is disposed generally adjacent the second side 28 of the top sheet of material 40, as shown in FIG. 9. In this position, the operator continues to roll the top sheet of material 40 and the floral grouping 12 disposed thereon in the rolling direction 60 and in the direction 58 thereby lifting the top sheet of material 40 from the staggered strips of adhesive 44a–e on the upper surface 20 of the next sheet of material 42 disposed generally beneath the top sheet of material 40 and simultaneously disconnecting the top sheet of material 40 and the next sheet of material 42 disposed under the top sheet of material 40. As the floral grouping 12 and the top sheet of material 40 are rolled over the staggered strips of adhesive 44a–e on the upper surface 20 of the top sheet of material 40, the staggered strips of adhesive 44a–e adhesively connects to an adjacent portion of the top sheet of material 40 thereby securing the top sheet of material 40 securely wrapped generally about the floral grouping 12, as shown in FIG. 10.

When the top sheet of material 40 has been secured about the floral grouping 12 in the manner just described, the next sheet of material 42, generally under the top sheet of material 40, then provides a new top sheet of material 40 and the process can be repeated for wrapping additional or other floral groupings 12.

The Embodiment of FIGS. 11–12

Shown in FIGS. 11–12 is a modified sheet of material 18a which is constructed exactly like the sheet of material 18 shown in FIGS. 1–10 and described in detail previously, except that each sheet of material 18a in the pad 38a is transparent, the staggered strips of adhesive 46a–d disposed on each sheet of material 18a are in the shape of parallelograms instead of the squares, the staggered strips of adhesive 46a–d are disposed in an alternating vertical alignment in the pad 38a, as previously described, and the inert material 52a is disposed near the first side 26a, the third side 30a, and the fourth side 32a of the sheets of material 18a in the pad 38a.

The sheet of material 18a is transparent, permitting the operator to view the next sheet of material 42a through the top sheet of material 40a. The operator can see the alternating locations of the staggered strips of adhesive 46a–d and 48a–d, disposed, respectively, on both the top sheet of material 40a and the next sheet of material 42a. The alternating vertical alignment of the staggered strips of adhesive 46a–d (top sheet 40a) and the staggered strips of adhesive 48a–d (next sheet of material 42a) in the pad 38a of sheets of material 18a is illustrated in FIGS. 11–12. The floral grouping 12 is rolled into the top sheet of material 40a by either method previously described in detail above and shown in FIGS. 4–6 and FIGS. 7–10.

The Embodiment of FIG. 13

Illustrated in FIG. 13 is a modified sheet of material 18b which is constructed exactly like the sheet of material 18 shown in FIGS. 1–5 and described in detail previously, except that each sheet of material 18b in the pad 38b is transparent, the sheets of material 18b do not have any inert material 52 disposed thereupon, and the sheets of material 18b have a plurality of staggered strips of adhesive 50 which are red-colored hearts (only one of the red hearts 50 is designated by the reference numeral in FIG. 13) disposed upon the upper surface 20b of each sheet of material 18b in the pad 38b. The staggered strips of adhesive 50 are uniformly sized, shaped and spaced. The plurality of staggered strips of adhesive 50 may vary in size, shape and placement. The floral grouping 12 is rolled into the top sheet of material 40b by either method previously described in detail above and shown in FIGS. 4–6 and FIGS. 7–10.

Changes may be made in the embodiments of the invention described herein or in parts or elements of the embodiments described herein or in the steps or in the sequences of steps of the methods described herein without departing from the spirit and scope of the invention as defined in the following claims.

What is claimed is:

1. A pad of wrapping material, comprising:
   a plurality of sheets of material stacked one on top of the other, each sheet of material having an upper surface, a lower surface, and a plurality of staggered strips of adhesive disposed on one of the upper and lower surfaces such that each sheet of material is releasably connected to an adjacent sheet of material via the staggered strips of adhesive, the staggered strips of adhesive arranged on each sheet of material so that the staggered strips of adhesive are in alternating vertical alignment when the sheets of material are stacked.

2. The pad of wrapping material of claim 1 wherein the staggered strips of adhesive are disposed near the periphery of the sheet of material.

3. The pad of wrapping material of claim 2 wherein the staggered strips of adhesive are disposed on the upper surface of each sheet of material such that each sheet of material is releasably connected to the lower surface of the upwardly adjacent sheet of material.

4. The pad of wrapping material of claim 3 wherein each of the sheets of material has a width extending between a first and a second side thereof and a length extending between a third and a fourth side thereof, the width and the length of each sheet of material sufficiently sized to wrap and encompass at least a portion of a floral grouping.

5. The pad of claim 1 wherein the alternating vertical alignment of the staggered strips of adhesive maintains the sheets of material in a substantially parallel relation to one another when the sheets of material are stacked.

6. The pad of wrapping material of claim 1 wherein each sheet of material comprises at least one transparent section, and wherein the staggered strips of adhesive of each sheet of material are disposed over at least a portion of the transparent section.

7. The pad of wrapping material of claim 1 wherein each staggered strip of adhesive has a thickness in a range from less than about 1 mil to about 30 mils.

8. The pad of wrapping material of claim 1 wherein each sheet of material is constructed from material in the group of materials consisting of paper, cellophane, foil, polymer film, fiber, burlap, or combinations thereof.

9. The pad of wrapping material of claim 1 wherein each sheet of material has a thickness in a range from less than about 1 mil to about 30 mils.

10. A pad of wrapping material for wrapping floral groupings, comprising:

a plurality of sheets of material, each sheet of material having an upper surface and a lower surface, each sheet of material having staggered strips of adhesive wherein the staggered strips of adhesive are disposed upon each sheet of material, and wherein the plurality of sheets of material together comprise a pad of the sheets of material, the pad comprising a top sheet of material and a next sheet of material disposed thereunder, the other sheets of material being disposed under the next sheet of material in the pad of sheets of material, each sheet of material further comprising an inert material disposed on each of the sheets of material wherein the inert material is disposed upon each sheet of material near a portion of the periphery of the sheet of material, and wherein the inert material is disposed in a location on each sheet of material which is mutually exclusive to the staggered strips of adhesive.

11. The pad of wrapping material of claim 10 wherein each sheet or material is defined further as including a first side, a second side, a third side and a fourth side, and wherein the inert material is disposed on the upper surface of each sheet of material, the inert material disposed near at least one side of each sheet of material.

12. The pad of wrapping material of claim 11 wherein the inert material is disposed near at least one of the first side, the third side, and the fourth side.

13. The pad of wrapping material of claim 10 wherein the inert material on each sheet of material has a thickness in a range from less than about 1 mil to about 30 mils.

14. A pad of wrapping material for wrapping floral groupings, comprising:
a plurality of sheets of material, each sheet of material having an upper surface and a lower surface, each sheet of material having staggered strips of adhesive wherein the staggered strips of adhesive are disposed upon each sheet of material, and wherein the plurality of sheets of material together comprise a pad of the sheets of material, the pad comprising a top sheet of material and a next sheet of material disposed thereunder, the other sheets of material being disposed under the next sheet of material in the pad of sheets of material, each sheet of material comprises at least one transparent section and the staggered strips of adhesive are disposed over at least a portion of the transparent section of each of the sheets of material, the staggered strips of adhesive comprising at least one color, and the staggered strips of adhesive further comprise at least one design.

15. A pad of wrapping material for wrapping floral groupings, comprising:
a plurality of sheets of material, each sheet of material having an upper surface and a lower surface, each sheet of material having staggered strips of adhesive wherein the staggered strips of adhesive are disposed upon each sheet of material, the staggered strips of adhesive are defined further as being near a portion of the periphery of the sheet of material, the plurality of sheets of material together comprise a pad of the sheets of material, the pad comprising a top sheet of material and a next sheet of material disposed thereunder, the other sheets of material being disposed under the next sheet of material in the pad of the sheets of material, the strips of adhesive on each sheet of material being adhesively connected to a portion of an adjacent sheet of material for cooperating to connect the sheets of material into the pad, the staggered strips of adhesive disposed on each sheet of material in the pad are in an alternating vertical alignment.

16. A pad of wrapping material, comprising:
a plurality of sheets of material stacked one on top of the other, each sheet of material having an upper surface, a lower surface, and a strip of adhesive disposed on one of the upper and lower surfaces such that each sheet of material is releasably connected to an adjacent sheet of material via the strip of adhesive, each sheet of material having a strip of inert material disposed on one of the upper and lower surfaces in a location which is mutually exclusive to the strip of adhesive.

17. The pad of claim 16 wherein the strip of inert material cooperates with the strip of adhesive to maintain the sheets of material in a substantially parallel relation to one another when the sheets are stacked.

18. The pad of wrapping material of claim 17 wherein the strip of adhesive comprises a plurality of staggered strips of adhesive.

19. The pad of wrapping material of claim 18 wherein the strip of adhesive and the strip of inert material each have a thickness, and wherein the thickness of the strip of inert material is substantially equal to the thickness of the strip of adhesive.

20. The pad of wrapping material of claim 19 wherein the thickness of the strip of adhesive and the thickness of the strip of inert material are in a range from less than about 1 mil to about 30 mils.

21. The pad of wrapping material of claim 16 wherein each sheet of material is constructed of a material selected from a group of materials consisting of paper, cellophane, foil, polymer film, fiber, burlap or combinations thereof.

22. The pad of wrapping material of claim 21 wherein the strip of inert material is constructed of a material selected from a group of materials consisting of paper, cellophane, foil, polymer film, fiber, burlap or combinations thereof.

* * * * *

UNITED STATES PATENT AND TRADEMARK OFFICE
CERTIFICATE OF CORRECTION

PATENT NO. : 5,344,016
DATED : September 6, 1994
INVENTOR(S) : Donald E. Weder et al.

It is certified that error appears in the above-identified patent and that said Letters Patent is hereby corrected as shown below:

Cover Sheet, under "OTHER PUBLICATIONS', Exhibit B, Line 3, after '2"' please insert -- 38.1--.

Column 1, lines 19-20, after 'ADHESIVE', please insert --APPLICATOR DISPENSER--.

Column 2, line 4, after '7-9', please delete "with the".

Column 2, line 26, after 'disposed', please insert --on--.

Signed and Sealed this

Seventh Day of February, 1995

Attest:

BRUCE LEHMAN

Attesting Officer     Commissioner of Patents and Trademarks